May 2, 1961 H. G. THOMPSON 2,982,362
SELF-INDEXING TWO-WAY PLOW
Filed Dec. 18, 1958 5 Sheets-Sheet 1

INVENTOR.
HOWARD G. THOMPSON
BY
Carlson, Pitzner, Hubbard & Wolfe
ATTORNEYS.

May 2, 1961 H. G. THOMPSON 2,982,362
SELF-INDEXING TWO-WAY PLOW
Filed Dec. 18, 1958 5 Sheets-Sheet 2
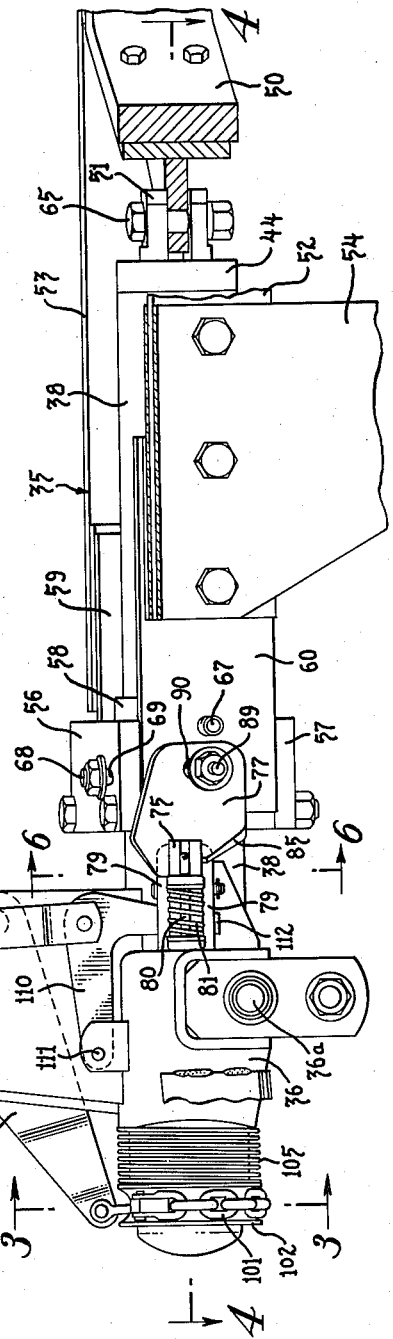
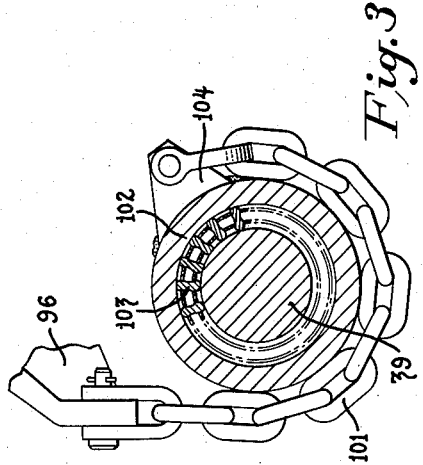
Fig. 3
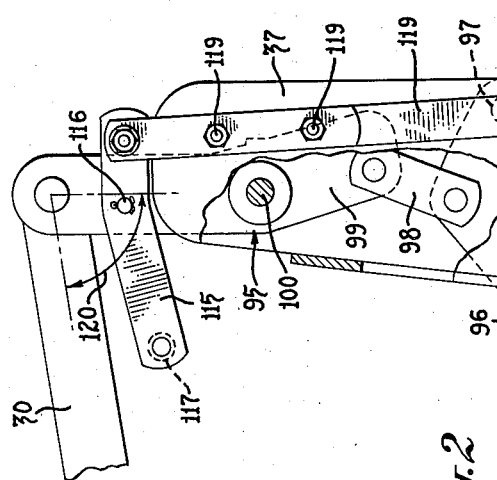
Fig. 2
INVENTOR.
HOWARD G. THOMPSON
BY
Carlson, Pitzner, Hubbard & Wolfe
ATTORNEYS.

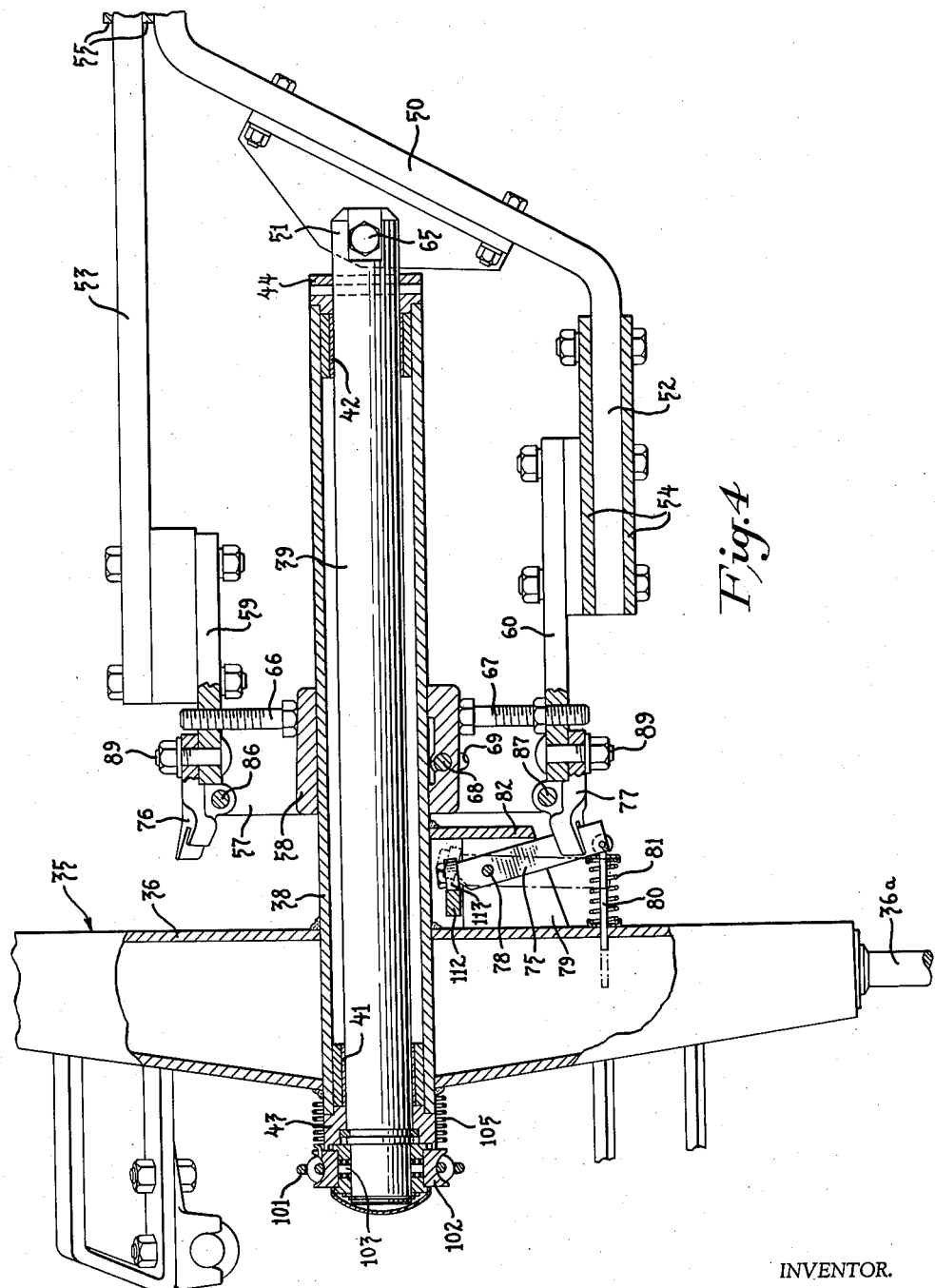

May 2, 1961  H. G. THOMPSON  2,982,362
SELF-INDEXING TWO-WAY PLOW

Filed Dec. 18, 1958  5 Sheets-Sheet 4

INVENTOR.
HOWARD G. THOMPSON
BY
Carlson, Pitzner, Hubbard & Wolfe
ATTORNEYS.

United States Patent Office 2,982,362
Patented May 2, 1961

2,982,362
SELF-INDEXING TWO-WAY PLOW
Howard G. Thompson, Livonia, Mich., assignor to Massey-Ferguson Inc., Racine, Wis., a corporation of Maryland Filed Dec. 18, 1958, Ser. No. 781,234
9 Claims. (Cl. 172—210)

The present invention relates generally to tractor mounted, ground-working agricultural equipment and concerning more particularly two-way, i.e., reversible, plows.

Plows of this type have sets of right and left hand plow bottoms mounted so that they can be alternately moved into operating position. Conventionally, the two sets of plow bottoms are mounted on a common frame that is rockable about a fore-and-aft axis at the rear of a tractor. By raising the plow assembly on the draft links of the tractor and rocking the common frame, either set of plow bottoms can be indexed into ground-working position.

It is the general aim of the present invention to provide a novel two-way plow of the above general character that is particularly adapted for use with tractors equipped with hydraulic lifts and which is fully self-indexing when elevated out of ground contact at the rear of a tractor.

With more particularity, it is an object to provide a novel change-over mechanism for a two-way plow which positively rotates, i.e., indexes, the plow to its alternate position each time the plow is lifted clear of the ground. It is a collateral object to provide such a mechanism that utilizes the energy stored in the raised plow for accomplishing the change-over operation so that no auxiliary power source is required.

It is also an object of the invention to provide a novel trip mechanism for a two-way plow as described above which releases the plow for indexing movement without attention from the operator when the plow is raised clear of the ground.

Moreover, it is an object to provide a novel two-way plow as characterized above which is sturdy and rugged for heavy duty farming use. In more detail, it is a related object to provide a novel latch mechanism for two-way plows of the above character which locks the plow so that it is quite rigid and solidly supported when in use.

In one of its aspects it is an object to provide a novel two-way plow of the general type described above which may be easily alined on the draft hitch of a tractor so that both sets of plow bottoms are properly disposed with respect to the tractor when in use.

Other objects and advantages of the invention will become apparent upon reading the following detailed description and upon reference to the drawings, in which:

Fig. 2 is an enlarged fragmentary view, partially in section, of the change-over mechanism embodied in the two-way plow shown in Fig. 1;

Fig. 3 is a fragmentary section taken along the line 3—3 of Fig. 2;

Fig. 4 is a fragmentary section taken along the line 4—4 of Fig. 2;

Figure 1:
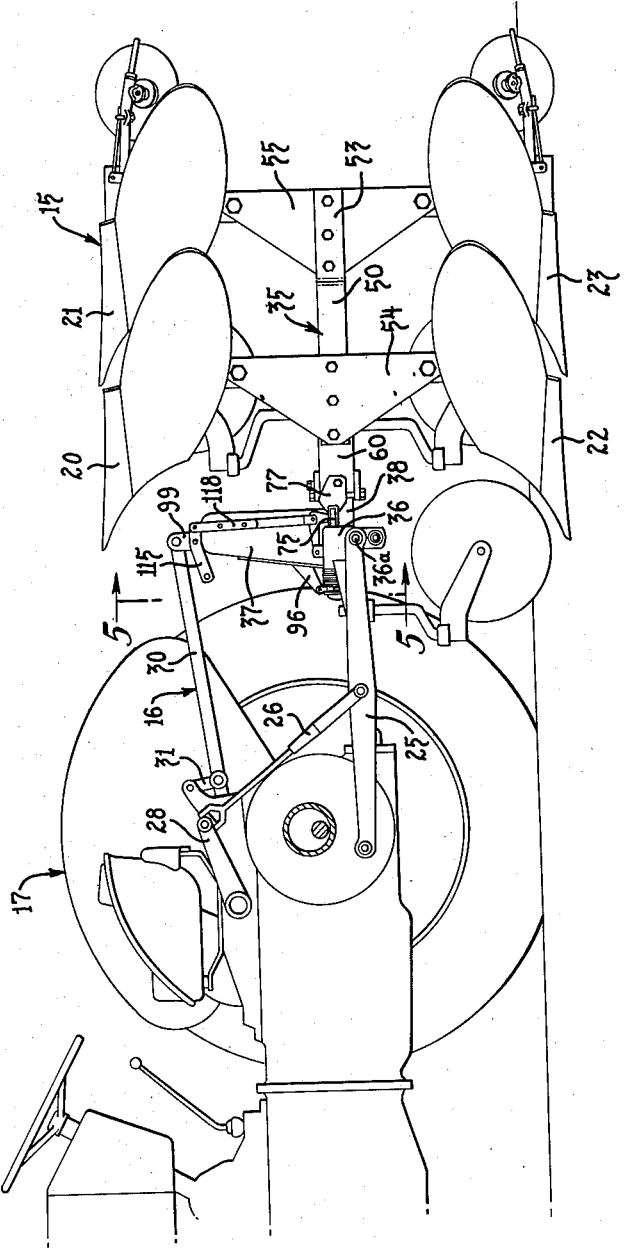
Figure 1 is a fragmentary view of a tractor, partially in section, having mounted thereon a two-way plow embodying the present invention.

While the invention will be described in connection with a preferred embodiment, it will be understood that I do not intend to limit the invention to that embodiment. On the contrary, I intend to cover all alternatives, modifications and equivalents as may be included within the spirit and scope of the invention as defined by the appended claims.

Turning now to the drawings, there is shown a two-way, two-bottom plow 15 embodying the invention mounted on an elevatable rear hitch 16 at the rear of a farm tractor 17. The exemplary plow includes two pairs of plow bottoms 20, 21 and 22, 23 although it will be understood that the invention may be used to advantage with plows or comparable implements having more or less than two ground engaging elements in each set. Each pair of plow bottoms 20, 21 and 22, 23 is alternately positionable to engage the ground and cut right and left furrows, respectively, as the tractor 17 advances. The plow bottom sets 20, 21 and 22, 23 are mounted for rotation about a generally fore-and-aft axis so that when the plow 15 is elevated by the hitch 16, the plow bottom sets may be indexed, i.e., rotated, between their alternate working positions.

The elevatable implement hitch 16 is of the well known "Ferguson System" type disclosed in Ferguson Patent No. 2,118,180, issued May 24, 1938. The hitch includes, in general, a pair of laterally spaced, forwardly converging, lower draft links 25 trailingly pivoted to the tractor body for vertical and limited horizontal swinging motion. A pair of drop links 26 connect the respective draft links 25 to a pair of lift arms 28 that are pivoted on the tractor and adapted to be rocked by a hydraulically powered mechanism as shown in the aforementioned patent. Rocking of the lift arms 28 in a counterclockwise direction as seen in Fig. 1 will, of course, raise the lower links 25 and elevate the plow 15 attached thereto.

The hitch 16 also includes an upper control link 30 which is pivoted at its forward end to a rocker member or shackle 31 that is carried by the tractor 17. The shackle 31 is coupled to the hydraulic control mechanism for the purpose of draft control as is explained in the patent identified above.

In accordance with one aspect of the invention, the plow 15 includes a sturdy, rugged frame 35 for rotatably supporting the sets of plow bottoms 20, 21 and 22, 23. In the illustrated embodiment, the frame 35 includes a hollow cross member 36 which is pivoted at its ends 36a between the trailing ends of the lower hitch links 25. An upstanding hollow pedestal 37 formed as an integral part of the frame 35 is coupled at its upper end to the rear of the upper hitch link 30.

Forming the main beam of the plow 15 is a longitudinally extending tube 38 which is secured as a rigid part of the frame 35 at the juncture of the cross member 36 and the pedestal 37. Journaled within the tube 38 is a shaft 39 which projects from both the front and rear ends of the tube (see Fig. 4). Bearings 41, 42 rotatably support the shaft 39 within the tube 38, and front and rear caps 43, 44, respectively, are carried by the shaft so as to close the opposite ends of the shaft 38 and prevent foreign material from working into the bearings.

For carrying the plow bottoms 20-23, a subframe 50 is secured to the rear projecting end 51 of the shaft 39 and is provided with plow beam portions 52 and 53 which extend fore-and-aft on opposite sides of the tube 38. Secured to the shorter plow beam portion 52 are plow standard plates 54 which support at their opposite ends the plow bottoms 20 and 22. Secured to the longer plow beam portion 53 are plow standard plates 55 which support at their opposite ends the plow bottoms 21, 23.

Figure 6:
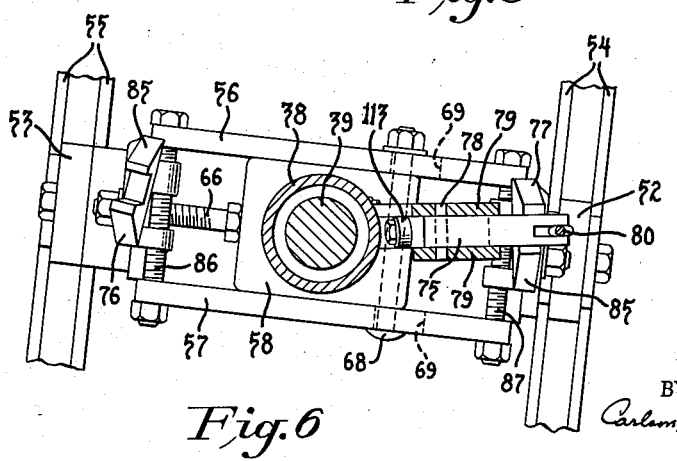
Fig. 6 is a fragmentary section taken along the line 6—6 of Fig. 2.

Supporting the forward ends of the plow beam portions 52, 53 are a pair of cross plates 56, 57 coupled to a rectangular block 58 that is journaled on the outer surface of the tube 38 (see Fig. 6). The cross plates 56, 57 are rigidly secured to brackets 59, 60 which constitute forward extensions of the plow beam portions 52, 53 (Fig. 4). It will be apparent that the plow bottoms 20–23 and their associated ground engaging elements are approximately balanced in a fore-and-aft direction about the connection of the subframe 50 with the end 51 of the shaft 39. Thus, the majority of the weight of the plow 15 is borne by the shaft 39 which rotates smoothly within the bearings 41, 42, and the connection formed by the cross plates 56, 57 with the block 58 primarily serves to steady and rigidify the subframe 50. The block 58, of course, rotates easily about the tube 38 when the plow is indexed.

For adjusting the lag or lead angle of the plow bottoms relative to the longitudinal center line of the frame 35, which corresponds to the tractor's direction of travel, the subframe 50 is pivoted on the end 51 of the shaft 39 by a pin 65, and the cross plates 56, 57 are adjustably coupled to the block 58 by means of adjusting screws 66, 67 (see Fig. 4). The cross plates 56, 57 slide along the opposite sides of the rectangular block 58 so that by rotating the adjusting screws 66, 67, the entire subframe 50 and thus the plow bottoms 20–23 can be swung about the pivot pin 65. This adjustment makes possible the application of a truly forward pull on the plow bottoms 20–23 and eliminates any tendency of the plow to swing the tractor and make steering difficult. For securing the subframe in adjusted position, a locking bolt 68 is passed through the block 58 and extends through slots 69 in the cross plates 56, 57 (see Figs. 4 and 6). By tightening the locking bolt, the cross plates 56, 57 are clamped to the block 58 in the desired position of adjustment.

In order to lock the subframe 50 in its two alternate positions wherein the respective sets of plow bottoms 20, 21 and 22, 23 are operatively disposed with respect to the frame 35, a latch mechanism is provided comprising a pivoted bar 75 which cooperates with notched members 76, 77 carried by the brackets 59, 60, respectively, at the forward ends of the beam portions 52, 53. The bar 75 is pivoted at 78 between a pair of parallel bracket plates 79 secured to the cross member 36. A rod 80, slidable in the cross member 36, is secured to the outer end of the bar 75 and positions a compressed helical spring 81 which urges the bar 75 in a counterclockwise direction as seen in Fig. 4. When the bar is not engaged by the notched members 76, 77, its spring urged movement is arrested by a wall 82 (see Fig. 4) which joins the rear edges of the bracket plates 79.

The notched members 76, 77 are provided with sloping cam surfaces 85 (see Figs. 2 and 6) which, when the subframe rotates in a clockwise direction as seen in Fig. 6, cams the latch bar 75 against its spring bias and allows the bar to snap into latching engagement with the notched member.

Figure 5:
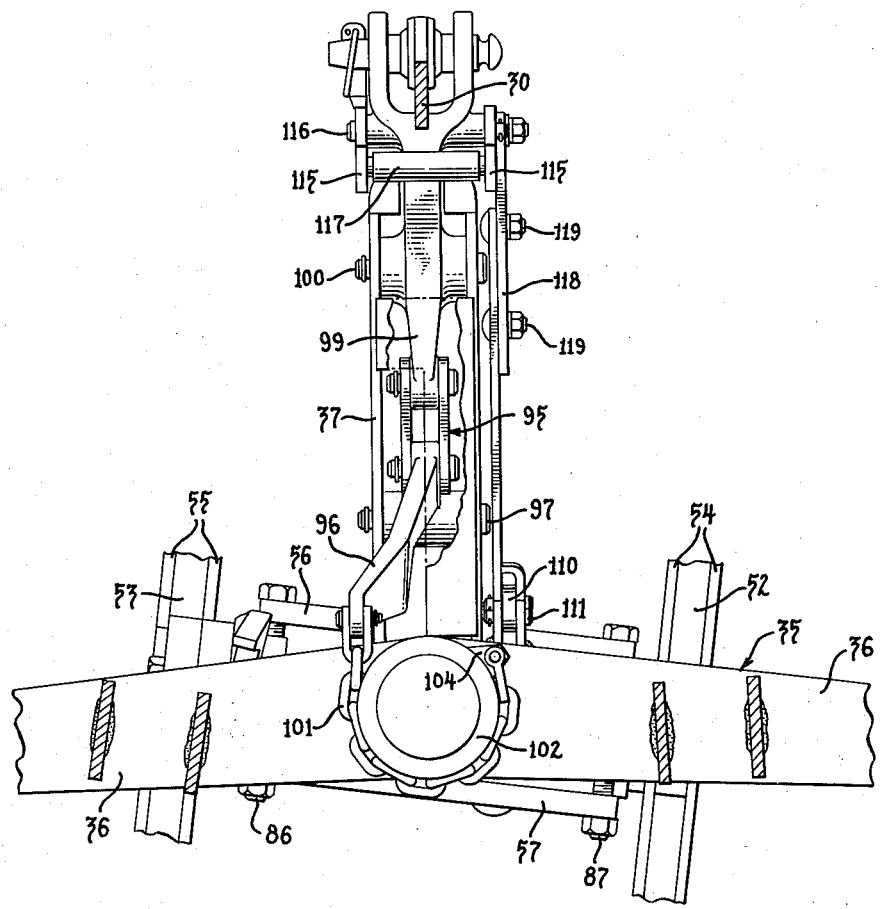
Fig. 5 is a fragmentary section taken along the line 5—5 of Fig. 1.

Preferably, the notched members 76, 77 are threaded onto adjusting bolts 86, 87, respectively, which are journaled in the cross plates 56, 57 (see Figs. 4 and 6). By rotating the bolts, the vertical position of the notched members may be adjusted on the subframe 50 and thus the alternate positions of the subframe 50 about its fore-and-aft axis can be adjustably established. As can be seen in Figs. 5 and 6, this adjustment is preferably made so that the plow standard plates 54, 55 are not truly vertical with respect to the tractor 17 when the subframe is latched since, in operation, a tractor is driven in a tilted position with one wheel riding in the previously formed furrow.

To maintain the positioning of the notched members 76, 77 when they have been adjusted, bolts 89 carried in apertures in the brackets 59, 60 are passed through slots 90 (see Fig. 2) in the notched members so that these members may be tightly clamped against the respective brackets 59, 60 once they have been adjusted.

For the purpose of indexing the plow 15 from one of its alternate positions to the other without an auxiliary power source, a change-over mechanism 95 is provided which utilizes the energy stored in the plow as it is elevated by the draft hitch 16 of the tractor. In the preferred embodiment, the change-over mechanism 95 includes an arm 96 pivoted at 97 within the pedestal 37. The arm 96 is coupled to the upper hitch link 30 through a link 98 and a lever 99 pivoted at 100 within the pedestal 37. The arrangement is such that a force urging the pedestal away from the upper link 30 causes an upward force to be exerted on the arm 96. That is, movement of the pedestal 37 away from the upper link 30 swings the lever 99 counterclockwise (as seen in Fig. 2) so as to lift the link 98 and swing the arm 96 upwardly.

The arm 96 is coupled to the forwardly extending end of the shaft 39 through a flexible member, taking the form of a chain 101, secured to a sheave 102 that is connected to the shaft 39 through an interposed one-way clutch mechanism 103. The chain 101 is wrapped about the sheave 102 in a counterclockwise direction as seen in Figs. 3 and 5 and is secured to the sheave through a lug 104 formed thereon. The one-way clutch 103 is preferably a standard commercial unit made up of an interconnected series of elements (see Fig. 3) which topple loosely upon relative rotation of the shaft 39 and sheave 102 in one direction, but which become jammed between the shaft and the sheave so as to lock these parts together when they attempt to rotate in the opposite relative direction. The clutch 103 is mounted so that the sheave 102 may turn freely in a counterclockwise direction about the shaft 39 (as seen in Fig. 3) and the sheave and shaft will rotate together upon clockwise movement of the sheave.

For restoring the change-over mechanism 95 to its ready-to-function Figs. 1 and 2 condition after an indexing operation, a torsion spring 105 is tensioned about the tube 38 and secured between the frame 35 and the sheave 102 so as to resiliently urge the sheave 102 in a counterclockwise direction as seen in Figs. 3 and 5. The spring 105 thus exerts a force tending to wind the chain 101 about the sheave 102.

The operation of the change-over mechanism 95 can be best seen by comparing Figs. 1, 2, 7, and 8 showing successive stages during the change-over or indexing operation. In Figs. 1 and 2, the plow 15 is shown lowered on the hitch links 25, 30 into ground working position with the latch bar 75 in engagement with the notched member 77 so as to hold the subframe rigid with the plow frame 35. The plow bottoms 22, 23 are thus supported in ground working position.

Figure 7:
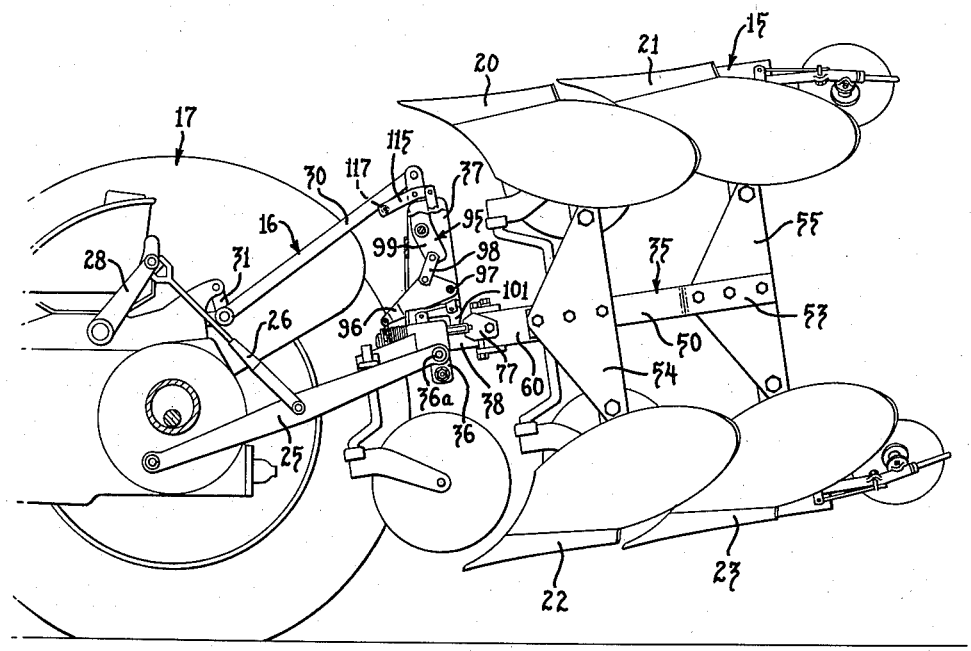
Fig. 7 is a view similar to Fig. 1 showing the plow raised on the draft links of the tractor just before an indexing operation.

When it is desired to index the plow 15 to its alternate position, the plow is raised on the hitch mechanism 16 to the position shown in Fig. 7. When so raised, the entire weight of the plow 15 acts about the plow's pivotal connections 36a with the lower draft links 25 to exert a substantial force tending to swing the pedestal 37 away from the upper link 30. As explained above, such a force tends to lift the arm 96 through the lever 99 and the link 98. The arm 96, through the chain 101, exerts a clockwise force on the sheave 102 (as seen in Figs. 3 and 5), but since the sheave is locked to the shaft 39 through the one-way clutch 103, no movement of the parts takes place until the subframe 50 carried by the shaft 39 is unlatched.

Figure 8:
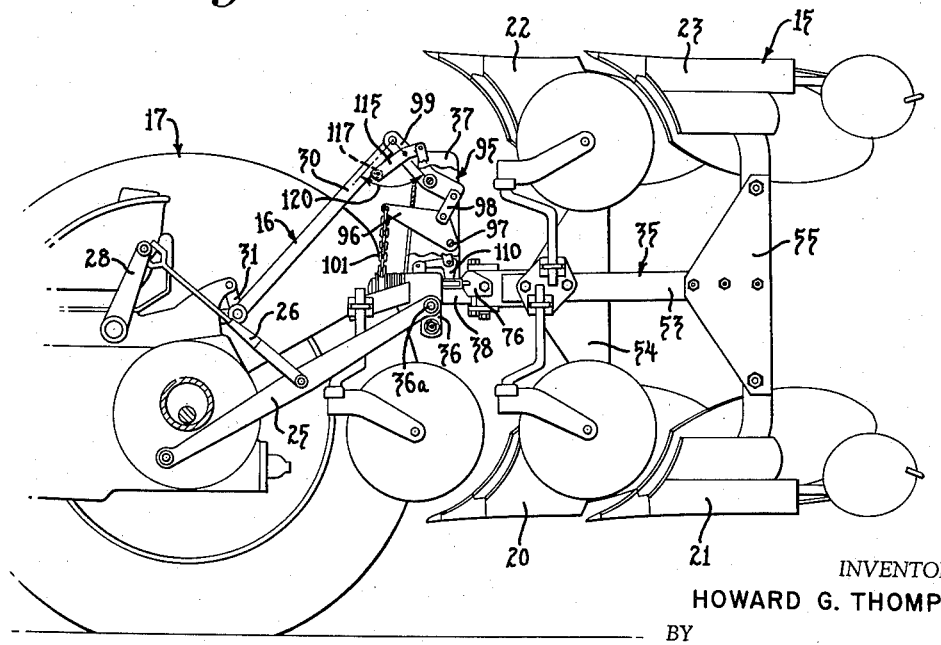
Fig. 8 is similar to Fig. 7 showing the plow after it has been indexed to its alternate position.

When the subframe is unlatched, the entire plow 15 "sags" to the position shown in Fig. 8. The movement of the pedestal 37 from the upper hitch link 30 raises the arm 96 which pulls the chain 101 upwardly and rotates the sheave 102 and the shaft 39 in a clockwise direction as seen in Fig. 3. The subframe 50 rotates with the shaft 39 until the latch bar 75 engages the notched member 76, thus swinging the set of plow bottoms 20, 21 into operative position.

When the plow is again lowered into contact with the ground, the weight of the plow ceases to exert a torque about the pivotal connections 36a and the plow "straightens out" with respect to the lower links 25. Thus, the pedestal 37 and the upper draft link 30 move relatively together which permits the torsion spring 105 to rotate the sheave 102 in a counterclockwise direction (as seen in Fig. 3) with the clutch 103 slipping idly. In this way the chain 101 is rewound about the sheave 102 and the linkage of the change-over mechanism 95 is restored to its initial, Figure 7 condition ready for the next plow indexing operation.

In accordance with the present invention, a trip linkage is provided for releasing the latch bar 75 when the plow 15 is raised on the draft linkage 16 so that the plow automatically indexes to its alternate position upon being elevated. In the embodiment illustrated, the trip linkage includes a trip member in the form of a bell crank 110 pivoted at 111 on the cross member 36 and having a lower arm 112 engageable with a roller 113 journaled on the latch bar 75 (see Figs. 2 and 4). The trip linkage also includes a double-arm trip lever 115 pivoted at 116 near the upper end of the lever 99 and carrying a pin 117 which underlies the upper hitch link 30. The trip lever 115 is coupled to the bell crank 110 by a two-piece link 118. The two pieces of the link 118 are relatively shiftable and are releasably joined by bolts 119 so that the length of the link 118 may be adjusted.

To understand the operation of the trip linkage, it will be noted that the angle between upper link 30 and the lever 99, designated 120 in Figs. 2 and 8, changes and becomes more acute as the plow 15 is elevated by the hitch 16. This causes the upper link 30 to move into engagement with the pin 117 and pivot the trip lever 115 in a counterclockwise direction. Pivoting of the lever 115 lifts the bell crank 110 through the link 118 and causes the arm 112 of the bell crank to swing the latch bar 75 out of engagement with the associated one of the notched members 76, 77 and release the subframe 50.

During the indexing operation the lever 99 tilts forwardly with respect to the pedestal 37 (see Fig. 8) so that the angle 120 is increased to approximately its original value and the link 30 ceases to bear on the pin 117. The helical spring 81 can then restore the latch bar 75 to its latching position.

It can now be appreciated that the plow 15 is fully self-indexing in that neither an auxiliary power source nor special attention from the operator is required to index the plow between its alternate operating positions. When the user of the plow reaches the end of a field he simply elevates the plow by means of the power lift mechanism on the tractor, turns the tractor around, drops the plow at the edge of the field and resumes operation. When the plow is raised, the upper hitch link 30 comes into contact with the pin 117 and the trip mechanism withdraws the latch bar 75 so that the change-over mechanism 95 can index the plow in the manner previously described. By adjusting the length of the two-piece link 118, the elevation point at which the plow will index can be selected by the operator. Once this adjustment is made the indexing operation needs no further attention from the operator.

I claim as my invention:

1. A two-way plow for use on a tractor having a power-elevatable rear hitch, the combination comprising, a main frame adapted for being pivotally coupled at its front end to said hitch, a subframe journaled on said frame along a fore-and-aft axis, right and left-hand plow bottoms secured on opposite sides of said subframe, a latch on said frame for releasably locking said subframe against rotation in either one of two angular positions, said plow bottoms being respectively operatively disposed with respect to said main frame when the subframe is locked in alternate ones of said positions, means carried by said main frame including a linkage adapted to be coupled to said hitch for deriving a force from the weight of said plow tending to rotate said subframe when the plow is elevated by the tractor hitch, and a trip mechanism for releasing said latch, said trip mechanism being actuated by said rear hitch when the plow is raised clear of the ground on said hitch so that said force causes rotation of the subframe to its alternate position.

2. A two-way plow for use on a tractor having a pair of trailingly pivoted lower links and a trailingly pivoted upper link together with means for elevating the lower links, comprising, in combination, a main frame adapted for being pivoted between the ends of the lower links, a subframe journaled in said frame along a fore-and-aft axis, alternately usable plow bottoms carried by said subframe, a latch on said main frame for releasably locking said subframe against rotation in either one of two angular positions, said plow bottoms being respectively disposed in operative relation with respect to said main frame when the subframe is locked in alternate ones of said positions, said main frame including an upstanding pedestal, a linkage carried on said pedestal and adapted to be coupled to the upper link, means coupling said linkage and said subframe so as to exert a force tending to rotate said subframe when the pedestal is urged away from the upper link, a trip lever pivoted on said main frame for releasing said latch and thus allowing said force to rotate the subframe, and a trip linkage on said pedestal for pivoting said lever and releasing said latch, said trip linkage being operated by said upper link as the angle between said pedestal and the upper link changes upon elevation of the plow on the lower links.

3. A two-way plow for use on a tractor having a pair of trailingly pivoted lower links and a trailingly pivoted upper link together with means for elevating the lower links, comprising, in combination, a frame adapted for being mounted on the lower links, alternately usable plow bottoms rockably carried by said frame, a latch on said frame for releasably locking said plow bottoms in either one of two angular positions in which said plow bottoms are respectively disposed in operative relation with respect to said frame, said frame including an upstanding pedestal, a linkage carried on said pedestal and adapted to be coupled to the upper link, means coupling said linkage and said plow bottoms so as to exert a force tending to rock said plow bottoms when the pedestal is urged away from the upper link, a trip lever pivoted on said frame for releasing said latch and thus allowing said force to rock the plow bottoms to their alternate position, and a trip linkage on said pedestal for pivoting said lever and releasing said latch, said trip linkage being operated by said upper link as the angle between said pedestal and the upper link changes upon elevation of the plow on the lower links.

4. In a tractor mounted plow assembly, the combination comprising a rear hitch on the tractor including a pair of trailingly pivoted lower links and a trailingly pivoted upper link, power means for elevating said lower links, a plow frame mounted on the ends of said lower links, alternately usable plow bottoms rockably carried by said frame, a latch on said frame for releasably locking said plow bottoms in either one of two angular positions in which said plow bottoms are respectively disposed in operative relation with respect to said tractor, said frame including an upstanding pedestal, a linkage carried on said pedestal and being coupled to the upper link, means coupling said linkage and said plow bottoms so as to exert a force tending to rock said plow bottoms when the pedestal is urged away from said link, a trip lever pivoted on said frame for releasing said latch and thus allowing said force to rock the plow bottoms to their alternate position, and a trip linkage on said pedestal for pivoting said lever and releasing said latch, said trip linkage being operated by said upper link as the angle between said pedestal and the upper link changes upon elevation of the plow on the lower links.

5. In a tractor mounted plow assembly, the combination comprising a rear hitch on the tractor including a pair of trailingly pivoted lower links and a trailingly pivoted upper link, power means for elevating said lower links, a plow frame pivoted between the ends of the lower links, a subframe journaled on said frame along a fore-and-aft axis, alternately usable plow bottoms carried by said subframe, a latch on said plow frame for releasably locking said subframe against rotation in either one of two angular positions, said plow bottoms being respectively disposed in operative relation with respect to said tractor when the subframe is locked in alternate ones of said positions, said plow frame including an upstanding pedestal, a linkage carried on said pedestal and being coupled to the upper link, means coupling linkage and said subframe so as to exert a force tending to rotate said subframe when the pedestal is urged away from said link, a trip lever pivoted on said plow frame for releasing said latch and thus allowing said force to rotate the subframe, and a trip linkage on said pedestal for pivoting said lever and releasing said latch, said trip linkage being operated by said upper link as the angle between said pedestal and the upper link changes upon elevation of the plow on the lower links.

6. In a tractor mounted plow assembly, the combination comprising a rear hitch on the tractor including a pair of trailingly pivoted lower links and a trailingly pivoted upper link, power means for elevating said lower links, a plow pivoted between the ends of the lower links, a subframe journaled on said main frame along a fore-and-aft axis, alternately usable plow bottoms carried by said subframe, a latch on said plow frame for releasably locking said subframe against rotation in either one of two angular positions, said plow bottoms being respectively disposed in operative relation with respect to said tractor when the subframe is locked in alternate ones of said positions, said plow frame including an upstanding pedestal, a linkage carried on said pedestal and being coupled to the upper link for deriving a force from the weight of the plow tending to rotate said subframe when the plow is elevated on the lower links, and a trip mechanism having a trip lever mounted between said pedestal and said upper link for releasing said latch as the angle between the pedestal and the upper link changes upon elevation of the plow on the lower links.

7. In a tractor mounted plow assembly, the combination comprising a rear hitch including a trailingly pivoted upper link, power means for elevating said rear hitch, a plow frame pivoted on said hitch, a subframe journaled on said frame along a fore-and-aft axis, alternately usable plow bottoms carried by said subframe, a latch on said plow frame for releasably locking said subframe against rotation in either one of two angular positions, said plow bottoms being respectively disposed in operative relation with respect to said tractor when the subframe is locked in alternate ones of said positions, said frame including an upstanding pedestal, a generally vertically disposed lever pivoted near the top of said pedestal and having its upper end coupled to said upper link, means coupling the lower portion of said lever and said subframe so as to exert a force tending to rotate said subframe when the pedestal is urged away from the upper link, a trip member pivoted on said frame for releasing said latch and thus allowing said force to rotate the subframe, a trip lever pivoted near the top of said pedestal and being coupled to said member, said trip lever being actuated to pivot the member and release the latch when the angle between the upper link and the lever coupled thereto becomes more acute as the plow is elevated on the rear hitch.

8. In a tractor mounted plow assembly, the combination comprising a rear hitch including a trailingly pivoted upper link, power means for elevating said rear hitch, a plow frame pivoted on said hitch, a subframe journaled on said frame along a fore-and-aft axis, alternately usable plow bottoms carried by said subframe, a latch on said plow frame for releasably locking said subframe against rotation in either one of two angular positions, said plow bottoms being respectively disposed in operative relation with respect to said tractor when the subframe is locked in alternate ones of said positions, said frame including an upstanding pedestal, a generally vertically disposed lever pivoted near the top of said pedestal and having its upper end coupled to said upper link, means coupling the lower portion of said lever and said subframe so as to exert a force tending to rotate said subframe when the pedestal is urged away from the upper link, a trip member pivoted on said frame for releasing said latch and thus allowing said force to rotate the subframe, a trip lever pivoted on said vertically disposed lever and being coupled to said member, said trip lever having a portion closely underlying said upper link so as to be actuated and pivot the trip member to release the latch when the angle between the upper link and the lever coupled thereto becomes more acute as the plow is elevated on the rear hitch.

9. In a tractor mounted plow assembly, the combination comprising a rear hitch including a trailingly pivoted upper link, power means for elevating said rear hitch, a frame pivoted on said hitch, a main beam journaled in said frame along a fore-and-aft axis, alternately usable plow bottoms carried by said main beam, a latch on said frame for releasably locking said beam against rotation in either one of two angular positions, said plow bottoms being respectively disposed in operative relation with respect to said tractor when the main beam is locked in alternate ones of said positions, said frame including an upstanding pedestal, a generally vertically disposed lever pivoted near the top of said pedestal and having its upper end coupled to said upper link, means coupling the lower portion of said lever and said beam so as to exert a force tending to rotate said beam when the pedestal is urged away from the upper links, a trip lever pivoted on said frame for releasing said latch and thus allowing said force to rotate the beam, a trip arm pivoted near the top of said pedestal and being coupled to said lever, said trip arm being activated to pivot the trip lever to release the latch when the angle between the upper link and the lever coupled thereto becomes acute as the plow is elevated on the rear hitch.

References Cited in the file of this patent

UNITED STATES PATENTS

| 2,591,711 | Moore | Apr. 8, 1952 |
| 2,712,276 | Cahow | July 5, 1955 |

FOREIGN PATENTS

| 183,587 | Austria | Oct. 25, 1955 |
| 940,739 | France | June 7, 1948 |
| 678,376 | Great Britain | Sept. 3, 1952 |

OTHER REFERENCES

Publications:
German application Serial No. K24,451 printed April 5, 1956 (Klasse 45A21).
Charrues Melotte, German application 1,006,192 printed April 11, 1957 (Klasse 45A21).